Oct. 30, 1934.  J. M. MITCHELL  1,979,169
SETTLING APPARATUS
Filed Oct. 14, 1932  2 Sheets-Sheet 1

Inventor
J. MacDonald Mitchell,

By Edmund H. Parry Jr.
Attorney

Oct. 30, 1934.   J. M. MITCHELL   1,979,169
SETTLING APPARATUS
Filed Oct. 14, 1932   2 Sheets-Sheet 2
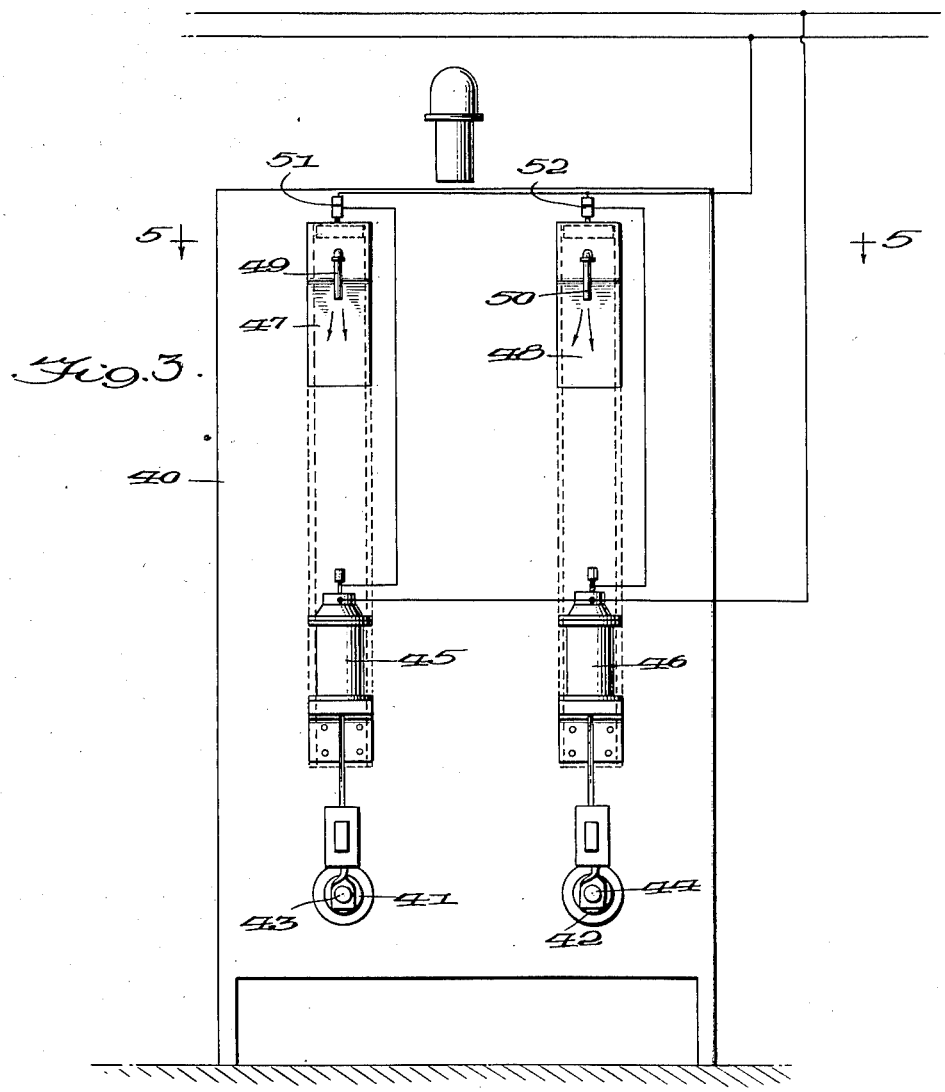
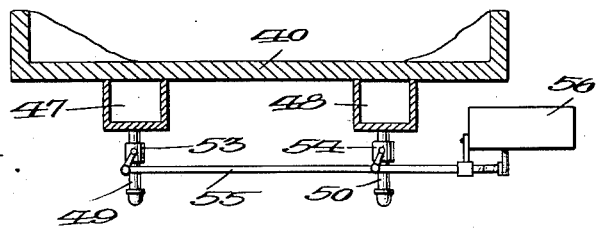
Inventor
J. MacDonald Mitchell,
By
Edmund H. Parry Jr.
Attorney Patented Oct. 30, 1934

1,979,169

UNITED STATES PATENT OFFICE 1,979,169

SETTLING APPARATUS

James Macdonald Mitchell, Old Lyme, Conn.

Application October 14, 1932, Serial No. 637,848

10 Claims. (Cl. 210—54)

This invention relates to settling apparatus for separating solid materials such as sand, gravel, minerals and the like from liquids.

In this type of device a tank is utilized having a valve discharge located in or near its bottom through which the solid materials are discharged after settling out of the liquid under the force of gravity.

The present invention has for its essential object the provision of automatic means for controlling the discharge of the solid materials which is of simple and efficient construction, and which may be readily installed in settling tanks of all sizes and shapes with equal facility. The proposed control means is of such character that it may be readily installed in tanks originally built with a manually controlled discharge for settled materials.

In my co-pending application Serial No. 637,847 filed of even date I have shown an automatic control means including a tubular member adapted to contain a liquid column fed by an independent liquid supply, the variations in the level of the liquid being utilized to effect actuation of the material discharge valve of the settling tank. In such apparatus the level of the liquid in the tubular member rises when the same is cut off from communication with the tank by the rise in level of the settled materials therein to cause the discharge valve to be opened.

The present invention, while resembling that disclosed in my previous application in many respects, has the advantage thereover that no independent liquid supply is required to cause changes in level of the liquid column in the tubular member. In the present instance the arrangement is such that the level of the liquid column never rises above that in the tank but, on the other hand, provision is made whereby upon the rise in the level of settled materials in the settling tank to isolate the liquid column the level thereof is caused to drop below the level of the liquid in the tank, and this change in level is utilized to control the discharge valve for settled materials.

The liquid column is provided with a discharge somewhat below the normal liquid level in the tank, the same preferably comprising a pipe of relatively small size so that as long as the liquid column is in communication at its lower end with the settling tank into which liquid containing solids will constantly flow there will be no tendency for the liquid in the column to drop below the level of the liquid in the tank. The discharge pipe for the liquid column may be constantly open so that the discharge valve of the tank will operate solely in accordance with the rise and fall of the level of the settled materials in the tank.

The invention is applicable to any type of settling tank including those which are built with a manually controlled discharge valve. The proposed automatic control means is simple in construction and very effective in operation. It may be used with equal success in tanks which are employed for settling porous materials or light and fine materials. Where, as in many instances, it is desirable to provide a settling tank with a plurality of discharge valves, either because of the size or shape of the tank or the necessity of effecting a rapid discharge of settled materials, separate automatic control means may be provided for the various valves. In the latter event the automatic control for the valves may work entirely independently of each other or, on the other hand, their operation may be synchronized so that the valves will open and close together or alternately.

I have in the accompanying drawings illustrated practical applications of all of the features above generally described wherein:

Fig. 3 is a side elevation of a settling tank utilizing a plurality of discharge valves with my invention applied thereto; and, Fig. 4 is a fragmentary view taken on the line 5—5 of Fig. 3 showing one way in which the automatic control means for the several discharge valves may be rendered interdependently operative.

Figure 1:
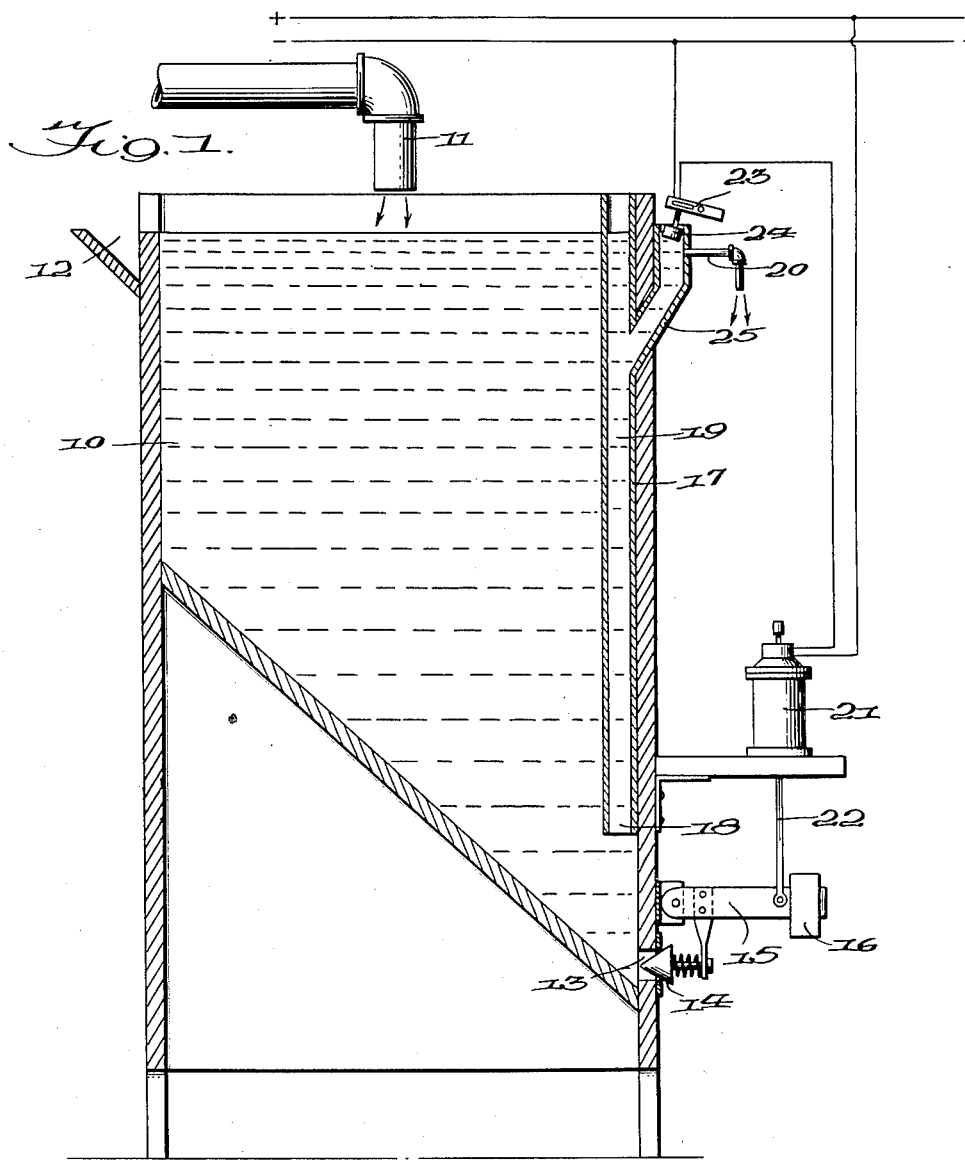
Fig. 1 is a view in sectional elevation illustrating one type of settling tank with my automatic control means applied thereto.

A settling tank is indicated by the reference numeral 10 into which mixed solids and liquids, such for example as sand and water, are introduced from a source of supply such as the pipe 11. Near the top of the tank is an overflow 12 into which the excess liquid from the tank passes. Solid materials coming in from the supply will gradually settle through the liquid to the bottom of the tank because of their greater weight. A discharge port to permit the withdrawal of the settled materials is located in or near the bottom of the tank. In the particular type of tank shown the port may be conveniently located in the side wall as indicated by 13. The discharge port will be controlled by a valve 14, the operation of which will be determined by the control mechanism hereafter to be described. Such valve may be conveniently supported on the pivotal arm 15 carrying a counter-weight 16 intended to maintain the valve normally closed. The essential feature of my control mechanism for the discharge valve comprises a liquid column communicating at its lower end with the tank, the arrangement being such that the rise of settled materials in the tank will destroy communication between the two. As long as communication exists the level of the column will be the same as that in the tank; but as soon as the column is cut off the level thereof will fall. The variation in level of the column, acting through suitable actuating mechanism will control the opening and closing of the material discharge valve.

The liquid column may be located inside or outside of the tank, it only being necessary that the two be in communication at some suitable point above the level of the discharge valve. Any suitable means to support the liquid column may be utilized which will provide communication between the lower end of the column and the tank and isolate the column at intermediate points and at its upper end. As shown in Fig. 1 this may comprise a tubular member 17 supported against one of the walls of the tank and having its lower end 18 opening into the tank.

At any suitable point below the normal liquid level in the tank the liquid column 19 is provided with a discharge 20, the latter preferably comprising a pipe of relatively small bore. I have found a ⅜-inch pipe quite satisfactory. If a larger pipe is to be used it is desirable that some arrangement be made whereby the flow thereof may be decreased, if necessary, in order that the discharge from the liquid column should not be too rapid.

With the arrangement described the level of the liquid column 19 will be maintained at the same level of the liquid in the tank by interflow therebetween as long as the lower end 18 of the tubular member is maintained open. When solid materials settle in the tank the level thereof will gradually rise to seal the end 18 of the tubular member and thus destroy communication between the liquid column and the liquid in the tank. Under such circumstances the level of liquid in the column will drop due to the outward flow through the discharge pipe 20. Of course the discharge 20, even if it be constantly open, will not cause the level in the liquid column to drop until the end of the tubular member is sealed since the liquid supply of the column will be constantly renewed as long as there is a flow of liquid into the tank through the supply pipe 11. When after the level in the column has dropped, the end of the tubular member is unsealed by a drop in level of the settled materials, the liquid column will again be in communication with the tank and the level thereof will rise, it being understood that two liquid columns which are in communication will stand at the same height when the pressure on each is the same. The rise and fall in level of the liquid column is taken advantage of for controlling the discharge valve 14 of the tank.

The discharge valve may be controlled mechanically or, as shown in Fig. 1, by an electric actuating mechanism such as a solenoid 21 connecting through the rod 22 with the pivoted arm 15 which carries the valve 14. Where such actuating mechanism is used the rise and fall in level of the liquid column will operate a circuit maker and breaker in the solenoid circuit. The circuit maker and breaker may be supported on a pivoted arm 23 carrying a float 24 which rises and falls with the liquid column. As a matter of convenience where the tubular member 17 is located inside the tank it may be provided with a branch 25 extending out through the side wall of the tank which will constitute a float chamber. The liquid column discharge 20 may be also located in this part of the tubular member. It will be understood however that this is merely a matter of convenience.

When the liquid column is in communication with the tank and the level in the tube the same height the float will occupy the position shown in Fig. 1 which will maintain the solenoid circuit open. When materials settle in the tank and the end of the tubular member 18 is closed the level in the liquid column will drop to lower the float and close the solenoid circuit, the solenoid then operating to open the discharge valve 14 and allow the settled materials to discharge through the port 13. After the level of the settled materials has dropped sufficiently to again open the lower end 18 of the tubular member the level in the column will immediately rise to raise the float and open the solenoid circuit and the valve 14 will be closed through the counter-weight 16.

While as heretofore pointed out, the discharge 20 for the liquid column may be located at any point below the normal liquid level in the tank it is preferable that the same be positioned only a short distance below the normal liquid level. As long as settled materials cut the liquid column off from the tank the level thereof will continue to fall. Assuming that the materials settle rapidly in the tank, it may well be that the column and tank will be out of communication for such time that if the column discharge 20 were located some distance below the normal liquid level in the tank, the level in the column would drop to a considerable extent. Under such circumstances there might possibly be a time delay when the level of the liquid column rises to its normal level to raise the float 24. By having the discharge pipe 20 located near the top of the liquid column as shown in the drawing the level of the column cannot drop below the position of the discharge pipe regardless of the time settled materials seal the lower end of the tubular member.

Figure 2:
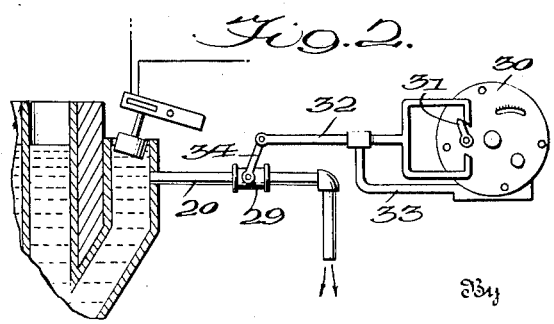
Fig. 2 is a fragmentary view corresponding to Fig. 1 illustrating particularly regulatory mechanism which may be used to cause my automatic control means to operate periodically.

Where, as shown in Fig. 1, the discharge 20 for the liquid column is continuously open, the level of the liquid and the operation of the discharge valve will depend solely on the rise and fall in level of the settled materials in the tank with reference to the lower end of the tubular member. When settled materials effect a seal of the tubular member the level of the liquid column will commence to fall and will continue to fall to open and hold open the material discharge valve 14. As long as the valve is open and settled materials pass out through the port 13 there will be a considerable turbulence in the tank which is not conducive to the continued settling of the solid materials out of the liquid. It may therefore be desirable when the apparatus is to be used in connection with fine or light materials, such, for example, as finely divided graphite or sand, which will not settle readily under turbulent conditions, to maintain the discharge valve open for very short periods. Possibly it may be desirable to maintain quiet liquid in the tank to promote settling for considerable periods up to twenty minutes or more during which there will be no flow between the tank and the column. This may be brought about by having the discharge 20 for the liquid column located only slightly below the level of the liquid in the tank so that as soon as the settled materials drop to even slightly open the lower end of the tubular member the level of the liquid column will quickly rise to a point where it will raise the float and cause the actuating mechanism to close the discharge valve 14. In addition to or in lieu of this arrangement, it may be found desirable to provide the discharge 20 for the liquid column with a periodically operating valve 29 shown in Fig. 2, the same being controlled by any suitable operating mechanism such as the time clock 30. If the latter device be used it may be provided with a rotating arm 31 acting through the sliding arm 32 supported in a bracket 33 and connecting with the valve through lever 34. The rotating arm 31 of the time mechanism will open and close the valve by alternately engaging the respective portions of the forked arm 32 at suitable time intervals determinable by the speed and rotation of the arm 31.

The opening and closing of the valve 29 will not affect the level of the liquid column as long as the same is in communication with the liquid in the tank, but as soon as settled materials rise to close the tubular member containing the liquid column the valve mechanism will become operative to allow the level of the column to fall slightly so that as soon as the discharge valve, which has been opened due to such fall in level, has been opened for just sufficient time to allow the level of settled materials in the tank to fall slightly below the end of the tubular member the level of liquid will quickly rise to close the discharge valve. Thus, by preventing any considerable fall in level of the settled materials, that is to say allowing only small quantities thereof to be discharged at one time, turbulence in the tank which accompanies the removal of the settled materials will be minimized and conditions will be maintained conducive to the continued settling of the solid materials out of the liquid in the tank.

According to the embodiments above described an automatic control mechanism comprising a variable liquid column is applied to a settling tank having a single material discharge valve. The control means may be used with equal success in connection with settling tanks having a plurality of discharge valves such as is common in connection with settling tanks of large capacity. Of course a single liquid column could be utilized for operating a plurality of discharge valves. This, however, is not particularly desirable since it may well be that the level of settled materials in the portions of the tank in proximity to the respective valves may vary considerably. It is therefore desirable that the various discharge valves be independently controlled in accordance with the conditions in the portions of the tank in proximity thereto. To this end a plurality of liquid columns may be provided, each having its lower end in communication with the tank in the region of one of the discharge valves, separate actuating mechanism for the respective valves being provided and controlled by the respective columns.

A construction as just generally described is illustrated in Fig. 3 wherein a settling tank 40 has a plurality of discharge ports 41 and 42 controlled respectively by valves 43 and 44, the latter being controlled by suitable actuating mechanism such as the solenoids 45 and 46. Liquid columns 47 and 48 such as that shown in Fig. 1 may be provided opening at their lower ends into the tank in proximity to the respective valves 43 and 44. Where, as is shown, the actuating mechanisms for the valves comprise solenoids the variation of levels in the columns such as may be caused by the discharge pipes 49 and 50 will act through float-controlled circuit breakers 51 and 52 which connect through independent circuits with the respective solenoids.

With the arrangement just described the opening and closing of the discharge valve 43 will be determined by the rise and fall in the level of settled materials in the portion of the tank in the region thereof. Similarly the valve 44 will be controlled in accordance with conditions in the tank in its locality. Of course the use of a plurality of discharge valves speeds up the operation of the settling tank and is exceedingly useful when a tank is to be used to separate solid materials which settle quickly and in large quantities.

While as above indicated it is desirable to provide independent control mechanism for a plurality of discharge valves, it may be desirable to synchronize their operation so that when settled materials have risen in the tank the discharge valves will operate either simultaneously or successively. It will of course be understood that neither of the valves can open until the particular liquid column which controls each has been cut off from communication with the tank by the rise of settled materials. Hence one valve may become operative while the other is entirely inoperative. In any case, however, the valves may be controlled so that when they do operate the discharge therefrom will either be simultaneous or successive. To this end, as shown in Fig. 4, the pipes 49 and 50 which cause the rise and fall in level in the respective liquid columns 47 and 48 may be provided with valves 53 and 54. The latter are actuated in unison by a common arm 55 which may be controlled by a clock mechanism 56 in the general manner shown in the embodiment of my invention in Fig. 2. If the discharge valves 43 and 44 are to open and close at the same time the valves 53 and 54 will open and close in unison. If the discharge valves are to operate alternately the valves 53 and 54 will be arranged so that when one is open the other is closed. Under either arrangement the several valves will become operative when the settled materials cut off both of the liquid columns 47 and 48. In case only one of the liquid columns is cut off due to a variation in the quantity of the settled materials in different portions of the tank only one of the discharge valves will become operative regardless of the fact that the pipes 49 and 50 controlling the respective liquid columns may through the operation of the valves 53 and 54 create the other conditions essential to the operation of both valves.

It will be understood that the embodiments of my invention illustrated in the drawings are merely illustrative and that the same is capable of a considerable range of modification and equivalency. I therefore do not intend to be limited in the practice of my invention to the details of construction herein shown and described, but, on the other hand, the invention is to be taken as limited only by the scope of the appended claims.

I claim:

1. An apparatus for settling solids out of liquids, comprising a tank having a liquid overflow and, at its lower end a discharge for settled material controlled by a valve, a liquid column communicating at its lower end with the tank at a point above the discharge and adapted to be cut off from the tank by the rise of settled material in the tank, means for lowering the level of the liquid column operative when the column is out of communication with the tank, and actuating means for opening the discharge valve controlled by the lowering in level of the liquid column.

2. An apparatus for settling solids out of liquids, comprising a tank having a liquid overflow and, at its lower end a discharge for settled material controlled by a valve, a liquid column communicating at its lower end with the tank at a point above the discharge, said column being adapted to be cut off from the tank by the rise of settled material in the tank but when not cut off receiving liquid from the tank so that the liquid level therein will assume the level of the liquid in the tank, a drain for the liquid column adapted to cause the level thereof to fall when the column is out of communication with the tank, and actuating means for opening the discharge valve responsive to the lowering in level of the liquid column by the drain.

3. An apparatus for settling solids out of liquids, comprising a tank having a liquid overflow and, at its lower end a discharge for settled material controlled by a valve, a liquid column communicating at its lower end with the tank at a point above the discharge and adapted to be cut off from the tank by the rise of settled material in the tank, a drain for the liquid column adapted to cause the level thereof to fall when the column is out of communication with the tank, said drain being located a short distance below the normal liquid level in the tank so as to prevent the level of the liquid column from falling materially below the normal level in the tank, and actuating means for opening the discharge valve controlled by the lowering in level of the liquid column.

4. An apparatus for settling solids out of liquids, comprising a tank having a liquid overflow and, at its lower end a discharge for settled material controlled by a valve, a housing supporting a liquid body adjacent a wall of the tank communicating with the tank at its lower end at a point above the discharge, the housing permitting free flow of liquid thereto from the tank so as to provide a uniform level of liquid in the housing and tank but the housing also being adapted to be cut off from the tank by the rise in settled material in the tank, means for withdrawing liquid from the liquid body in the housing operative to cause the level thereof to fall when the body is out of communication with the tank, and actuating means for opening the discharge valve controlled by the lowering in level of the liquid body.

5. An apparatus for settling solids out of liquids, comprising a tank having a liquid overflow and, at its lower end a discharge for settled material controlled by a valve, an upstanding hollow member supporting a liquid body communicating with the tank at a point above the discharge and adapted to be cut off from the tank by the rise of settled material in the tank, a drain for the hollow member located below the normal liquid level in the tank, said drain being operative when the hollow member is cut off from the tank to cause changes in level of the liquid body with respect to the level of liquid in the tank, the drain however being inoperative to vary the level of liquid in the hollow member when said member is in communication with the tank, a float adapted to rise and fall with changes in level of the liquid body, and actuating means for opening the discharge valve controlled by the falling of said float.

6. An apparatus for settling solids out of liquids, comprising a tank having a liquid overflow and, at its lower end a discharge for settled material controlled by a valve, an upstanding hollow member supporting a liquid body communicating with the tank at a point above the discharge and adapted to be cut off from the tank by the rise of settled material in the tank, a liquid chamber communicating with the hollow member, a drain for the chamber located below the normal liquid level in the tank and adapted to cause the level in the chamber to drop when the liquid body is out of communication with the tank, and actuating means for opening the discharge valve controlled by the lowering in level of liquid in the chamber by the drain.

7. An apparatus for settling solids out of liquids comprising a tank having at its lower end a discharge controlled by a valve, actuating means for the discharge valve, and control means for the valve actuating means comprising a liquid column communicating with the tank above the discharge valve and adapted to be cut off from the tank by the rise of settled materials therein, said column being fed solely from the liquid in the tank and being provided with a restricted constantly open drain operative to cause the level in the column to fall when the column is cut off from the tank to operate the actuating means for opening the discharge valve.

8. An apparatus for settling solids out of liquids, comprising a tank having a liquid overflow and, at its lower end a discharge for settled material controlled by a valve, an upstanding hollow member supporting a body of liquid communicating with the tank at a point above the discharge and adapted to be cut off from the tank by the rise of settled material therein, a drain pipe for the hollow member located below the normal liquid level in the tank and operative to cause the level of the liquid body to fall when the same is cut off from the tank, periodically operative valve means in the drain pipe for regulating the flow of liquid therethrough, and actuating means for the discharge valve rendered operative by the lowering in the level of said liquid body to open said discharge valve.

9. An apparatus for settling solids out of liquids, comprising a tank having a liquid overflow and, at its lower end a plurality of discharges for settled material each controlled by a valve, liquid columns communicating with the tank at points above the discharges and adapted to be cut off from the tank by the rise in level of settled material in the tank, means for causing lowering in level of the respective liquid columns when cut off from the tank, and actuating means for each of the discharge valves operative each upon the lowering in level of one of the liquid columns to open said discharge valve.

10. An apparatus for settling solids out of liquids, comprising a tank having a liquid overflow and, at its lower end a plurality of discharges for settled material each controlled by a valve, liquid columns communicating with the tank at points above the discharges and adapted to be cut off from the tank by the rise in level of settled material in the tank, each of the columns having a drain located below the normal liquid level in the tank adapted to cause the level in the respective columns to fall when cut off from the tank, valves for regulating the flow through the respective drains, periodically operative mechanism controlling the several valves, and actuating means for opening one of the discharge valves as a result of lowering of the level of one of the liquid columns.

JAMES MACDONALD MITCHELL.